United States Patent

Zavaljevski et al.

Patent Number: 6,101,235
Date of Patent: Aug. 8, 2000

[54] METHODS AND APPARATUS FOR ALTERING SPATIAL CHARACTERISTICS OF A DIGITAL IMAGE

[75] Inventors: Aleksandar Zavaljevski; Christopher J. Mussack; David M. Deaven, all of Waukesha, Wis.

[73] Assignee: General Electric Company, Milwaukee, Wis.

[21] Appl. No.: 09/085,474

[22] Filed: May 27, 1998

[51] Int. Cl.[7] .............................. A61B 6/03; G01N 23/04
[52] U.S. Cl. .................. 378/4; 378/62; 378/98.2
[58] Field of Search .............................. 378/4, 8, 19, 62, 378/98.2, 98.8

[56] References Cited

U.S. PATENT DOCUMENTS

| | | | |
|---|---|---|---|
| 5,374,995 | 12/1994 | Loveridge et al. | 358/447 |
| 5,530,797 | 6/1996 | Uya et al. | 395/164 |
| 5,666,160 | 9/1997 | Hwang | 348/240 |
| 5,754,348 | 5/1998 | Soohoo | 359/802 |

*Primary Examiner*—David V. Bruce
*Attorney, Agent, or Firm*—Armstrong Teasdale; Christian G. Cabou; Phyllis Y. Price

[57] ABSTRACT

The present invention, in one form, includes methods and apparatus for altering the spatial characteristics of a digital image collected in a CT system using a real-time magnification algorithm. In accordance with one embodiment of the algorithm, once the digital image is collected, an enlarged image is generated by interpolating and filtering the original digital image data. In one aspect, two pass linear interpolation and one dimensional filtering is utilized to generate the enlarged image. The first pass performs interpolation in the x direction and the second pass performs interpolation in the y direction. The interpolations in the x and y directions are performed in two steps. Initially, linear interpolation is applied to the original digital image to generate interpolated data. A one dimensional convolution filter is then applied to the interpolated data. Utilizing this process, a high quality enlarged image may be generated for any integer zoom factor. In another aspect of the present invention, a two step procedure of interpolation and two dimensional filtering is utilized. The first step performs bilinear interpolation of the digital image to generate interpolated data. The interpolated data is then filtered by a two dimensional convolution filter.

45 Claims, 3 Drawing Sheets

|  |  | F |  |
|---|---|---|---|
| $I_{11}$ | $I_{12}$ | $I_{13}$ | $I_{14}$ |
| $I_{21}$ | $b_{11}\ b_{12}$ $b_{21}\ I_{22}$ | $I_{23}$ | $b_{17}$ $b_{27}$  $I_{24}$ |
| $I_{31}$ | $I_{32}$ | $O_{11}\quad O_{13}$ $I_{33}$ $O_{31}\quad O_{33}$ | $I_{34}$ |
| $I_{41}$ | $b_{71}\ b_{72}$ $I_{42}$ | $I_{43}$ | $b_{77}$ $I_{44}$ |

FIG. 4

METHODS AND APPARATUS FOR ALTERING SPATIAL CHARACTERISTICS OF A DIGITAL IMAGE

FIELD OF THE INVENTION

This invention relates generally to medical imaging and more particularly, to magnifying digital images produced during CT scans.

BACKGROUND OF THE INVENTION

In at least one known CT system configuration, an x-ray source projects a fan-shaped beam which is collimated to lie within an X-Y plane of a Cartesian coordinate system, generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles during one revolution of the x-ray source and detector. In an axial scan, the projection data is processed to construct an image that corresponds to a two dimensional slice taken through the object.

One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a cathode ray tube display.

To reduce the total scan time required for multiple slices, a "helical" scan may be performed. To perform a "helical" scan, the patient is moved in the z-axis synchronously with the rotation of the gantry, while the data for the prescribed number of slices is acquired. Such a system generates a single helix from a fan beam helical scan. The helix mapped out by the fan beam yields projection data from which images in each prescribed slice may be reconstructed. In addition to reduced scanning time, helical scanning provides other advantages such as better control of contrast, improved image reconstruction at arbitrary locations, and better three-dimensional images.

In CT systems, digital images are generated to provide a two dimensional view of an object. For example, utilizing a CT fluoroscopic system, the CT system may be used to provide images to help in guiding a medical treatment device to a desired location within a patient.

With known CT systems, the general objective is to provide the physician with as much useful information as quickly as possible to complete the procedure. In order to properly guide the device, the physician may require a real-time enlarged, or magnified, image. With known CT systems various methods are used for generating the real-time image, e.g., nearest neighbor and bilinear interpolation.

While some of these methods, e.g., nearest neighbor, are included in standard graphical packages, for example, Open GL, these methods produce poor quality images. However, those methods that produce high quality real-time images, e.g., bicubic interpolation, are not readily available for execution in a commonly available Open GL system.

It would be desirable to generate high quality real-time enlarged images from CT scan images. Particularly, it would be desirable to generate high quality real-time enlarged images utilizing commonly available image processing routines, for example Open GL. It would also be desirable to approximate bicubic interpolation using such routines. cl SUMMARY OF THE INVENTION These and other objects may be attained by a system which includes apparatus and methods for altering the spatial characteristics of a digital image. The apparatus and methods are generally referred to herein as real-time image magnification. More particularly, in accordance with one embodiment of the present invention, after collecting a digital image, an enlarged image is generated by interpolating and filtering the original digital image data.

In one aspect, two pass linear interpolation and one dimensional filtering is utilized to generate the enlarged image. Particularly, the first pass performs interpolation in the x direction, and the second pass repeats the same procedure for interpolation in the y direction. The interpolations in the x and y directions are performed in two steps. Initially, linear interpolation is applied to the original digital image to generate interpolated data. A one dimensional convolution filter is then applied to the interpolated data. Utilizing this process, a high quality enlarged image may be generated for any integer zoom factor.

In another aspect, a two step procedure including interpolation and two dimensional filtering is utilized. Particularly, the first step performs bilinear interpolation of the digital image to generate interpolated data. The interpolated data is then filtered by a two dimensional convolution filter.

The above described algorithms generate high quality enlarged images from an original digital image. Further, the algorithms approximate bicubic interpolations using commonly available graphic packages.

BRIEF DESCRIPTION OF THE DRAWINGS

FIG. 4 illustrates a pixel scheme for bilinear processing in accordance with one embodiment of the present invention.

DETAILED DESCRIPTION

Figure 1:
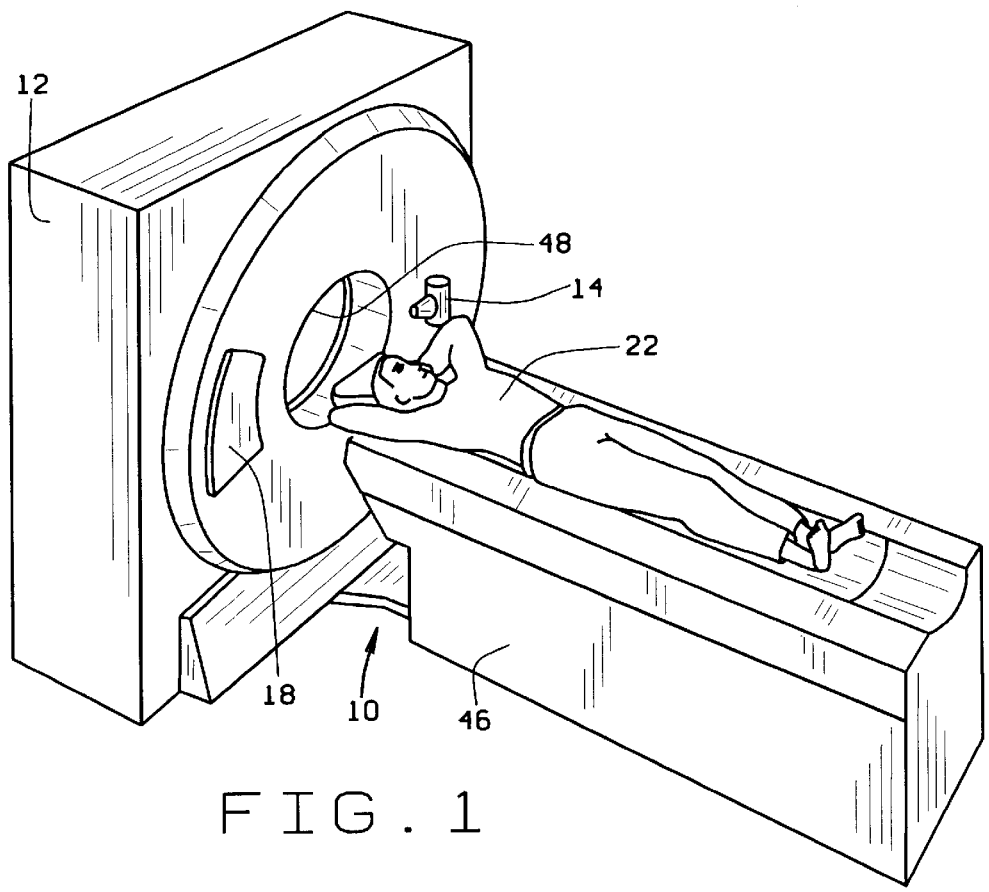
FIG. 1 is a pictorial view of a CT imaging system.
Figure 2:
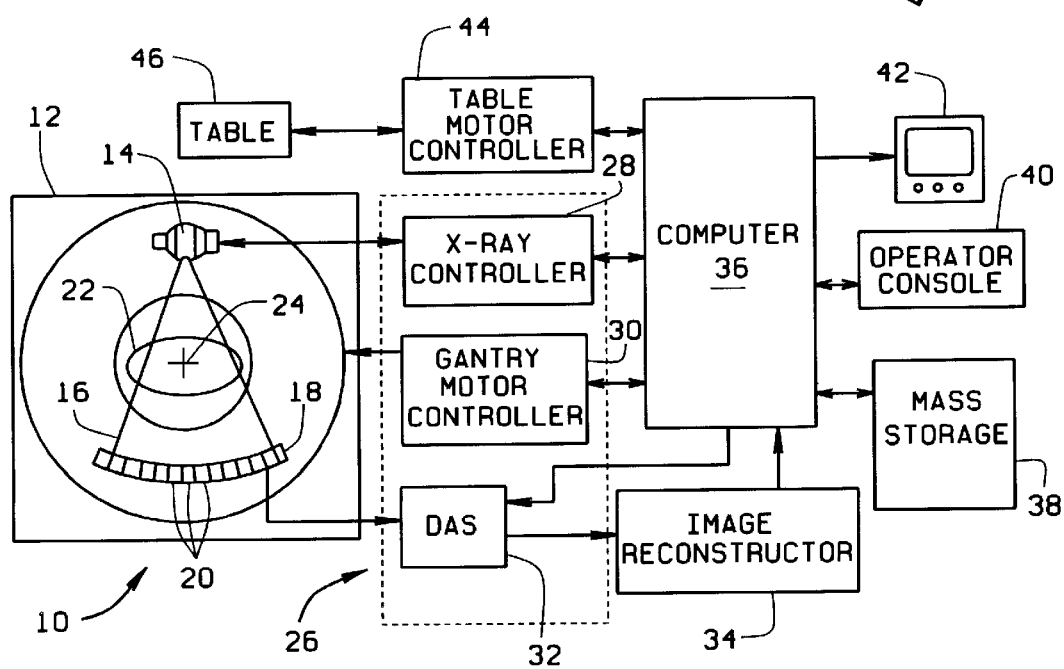
FIG. 2 is a block schematic diagram of the system illustrated in FIG. 1.

Referring to FIGS. 1 and 2, a computed tomograph (CT) imaging system 10 is shown as including a gantry 12 representative of a "third generation" CT scanner. The present invention is not limited to practice in connection with third generation scanners and can be used, for example, in fourth generation scanners and in CT electron beam type scanners. Therefore, although the present invention is sometimes described herein in connection with third generation scanners, it should be understood that such description is by way of example only, and not by way of limitation.

With respect to system 10, gantry 12 has an x-ray source 14 that projects a beam of x-rays 16 through a source collimator (not shown) and at a gantry angle (not shown) toward a detector array 18 on the opposite side of gantry 12. Detector array 18 is formed by detector elements 10 which together sense the projected x-rays that pass through a medical patient 22. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38. Preferably, the reconstructed image is stored as a data array.

Computer 36 also receives commands and scanning parameters from an operator via console 40 that has a keyboard. An associated display 42, such as a flat panel or a cathode ray tube display, allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48. As used herein, an Xmm by Xmm scan refers to scanning an object of interest using an X mm collimator aperture at a 1:1 helical pitch, wherein helical pitch is the ratio of table 46 movement in one rotation of the x-ray source 14 to the slice width defined by the source collimator.

The following discussion which describes altering the spatial characteristics of a digital image sometimes refers specifically to a computed tomography (CT) system. The spatial characteristics algorithms, however, are not limited to practice with only CT systems, and may be used with other medical imaging devices as well as other image producing devices, such as copy machines and digital cameras.

It should be further understood that the algorithms would be implemented in computer 36 and would process, for example, image data stored in mass storage 38. Alternatively, the algorithms could be implemented in image reconstructor 34. Other alternative implementations are, of course, possible.

As described below in more detail, algorithms for altering the spatial characteristics of digital images can be utilized for such magnification. Generally, one algorithm uses a two pass scheme in which each of the passes represents interpolation in the x and y directions respectively. Cubic interpolation in each direction is approximated using linear interpolation followed by a one dimensional convolution filter. The other algorithm applies bilinear interpolation first, followed by a two dimensional convolution filter. The methods can be practiced using the OpenGL graphic package, which is well known in the art. Also, the linear, bilinear, cubic and bicubic interpolations are well known procedures, along with the linear least squares estimation method. By combining linear and bilinear interpolations and digital convolution filters to approximate bicubic interpolation, advantages such as a quickly executable routine are possible. Generally, the algorithms use functions of linear interpolation and digital convolution filters, that are accelerated in OpenGL to approximate the bicubic interpolation. Linear, or bilinear, interpolation is a well defined function. Set forth below are the coefficients of convolution filters to be used in the algorithms.

More particularly, and in the first algorithm, two pass linear interpolation and 1 D filtering is utilized. The first pass performs interpolation in the x direction, and second pass repeats the same procedure for interpolation in the y direction. Interpolations in x and y directions are implemented using identical procedures, and both are performed in two steps. The linear interpolation is performed first, and then the 1 D convolution filter is applied to the interpolated data. The algorithm can be applied for any integer zoom factor n, and for any 1 D convolution filter size m.

To determine the coefficients of the 1 D convolution filter, the following procedure is used. The first step in the procedure is linear interpolation. The values of new pixels $B_i$, with respect to the pixel values of the source image $I_i$, are given by the following equations:

$$B_i = \frac{(n-i=+1)}{n} I_1 + \frac{(i-1)}{n} I_2 \quad (1)$$

for i=1, ... n where n is an odd number, and $$B_i = \frac{(n-i+0.5)}{n} I_1 + \frac{(i-0.5)}{n} I_2 \quad (2)$$

for i=1, ... n where n is an even number.

Using the linearly interpolated pixels $b_i$, (instances of $B_i$; i=1, 2, ... m) the m by 1 convolution filter is applied to obtain the output-pixel $O_k$. Therefore, the following expression for the output pixel $O_k$ is obtained:

$$O_i = \sum_{i=1}^{m} a_i b_i \quad (3)$$

where $a_i$ (i=1, ... m) are the coefficients of the convolution filter. When the expressions for $b_i$ (i=1, ..., m), or the values of corresponding $B_{op}$ from equations (1) or (2), are substituted in equation (3), the following expression is obtained:

$$O_i = \sum_{i_1=1}^{i} \sum_{i_2=1}^{m} k_{i_1 i_2} a_{i_2} I_{i_1} \quad (4)$$

where $k_{ij}$ are the constant coefficients obtained by applying equations (1) or (2):

Using known expressions for cubic interpolation, an alternate expression for the pixel value $O_k$ can be obtained:

$$O_k = \sum_{i=1}^{4} c_i I_i \qquad (5)$$

where $c_i$ are the coefficients derived from the expressions for cubic interpolation in the case of magnification by n. Comparing equations (4) and (5), and equating coefficients with corresponding input pixels values $I_i$, the set of up to four linear equations for the coefficients $a_m$ of the filter is obtained:

$$\sum_{i_2=1}^{m} k_{ii_2} a_{i_2} = c_i \qquad (6)$$

There can be less than four equations if the pixels obtained by linear interpolation used by the convolution filter do not have any contribution from some input pixels $i_i$. In that case, the number of equations is reduced by the number of such pixels.

The same procedure is repeated for the set of n consecutive output pixels $O_i$ (i=1, ..., n) that have different locations relative to the input pixels, and a system of linear equations for the convolution filter coefficients is obtained.

This system can be expressed in matrix form as:

$$C = KA \qquad (7)$$

where C is the vector of corresponding coefficients $c_i$ from right sides of equations (6), K is the matrix of coefficients $k_{ij}$ of those linear equations, and A is vector of m filter coefficients $a_i$, (i=1, ..., m). For practical values of zoom factors n and filter sizes m this represents an overdetermined system of linear equations. In this case, the solution is determined by using the linear least squares method, and it has the form:

$$A = (K^T K)^{-1} K^T C \qquad (8)$$

Upon determining the coefficients A of the convolution filter that is to be applied, the whole procedure for altering the spatial characteristics of a digital image is defined.

Figure 3:
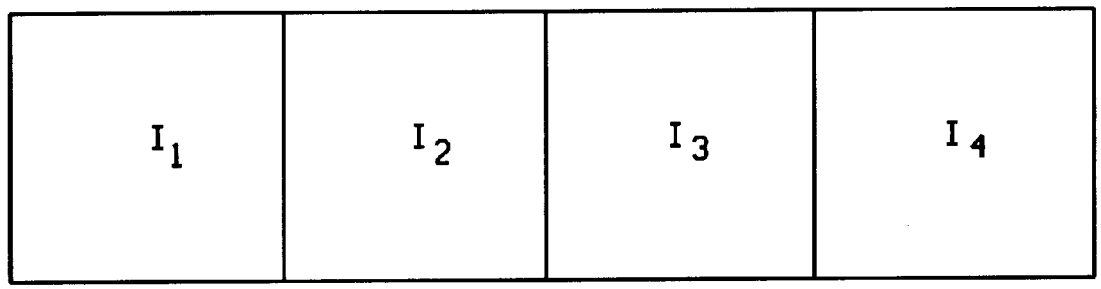
FIG. 3 illustrates a pixel scheme for processing a digital image in the x direction in accordance with one embodiment of the present invention.
Figure 3:
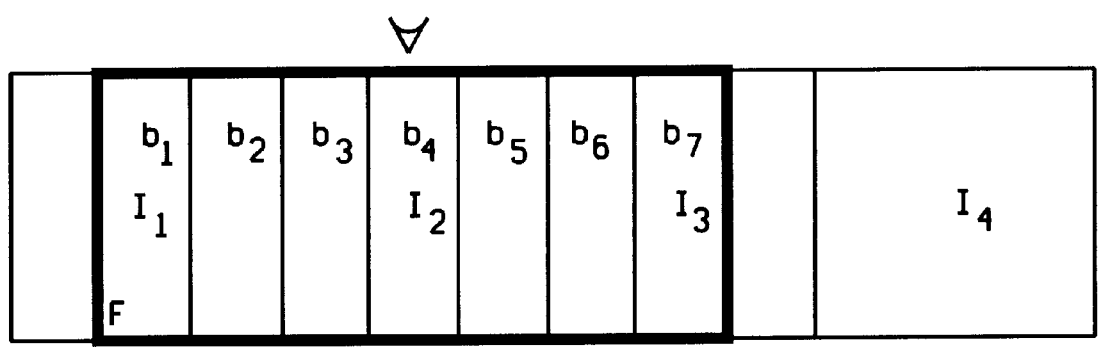
Figure 3:
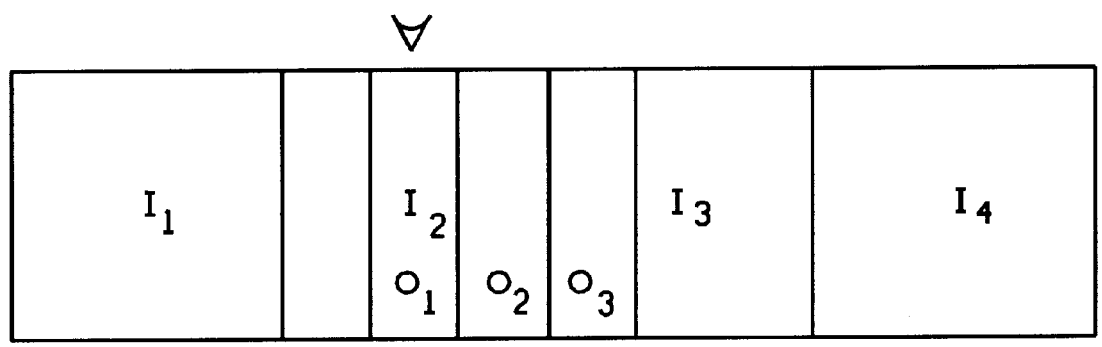

For example, in generating a triple size enlarged image, the two pass algorithm has a magnification of three and uses a seven by one convolution filter. Specifically, the linear zoom of three and a one dimensional 7 by 1 filter are applied in the x direction first. The same linear zoom and the same one dimensional filter, is then applied in the y direction. The pixel scheme for processing in the x direction is illustrated in FIG. 3, where $I_i$ denote input pixels.

Linear interpolation is applied to the input pixels, $I_i$, to generate results of linear interpolation, $b_i$. In the case of magnification of three, as shown in FIG. 3, values for $b_i$ are calculated using the following relations:

$$b_1 = I_1 \qquad (9)$$

$$b_2 = \frac{2I_1}{3} + \frac{I_2}{3} \qquad (10)$$

$$b_3 = \frac{I_1}{3} + \frac{2I_2}{3} \qquad (11)$$

$$b_4 = I_2 \qquad (12)$$

$$b_5 = \frac{2I_2}{3} + \frac{I_3}{3} \qquad (13)$$

$$b_6 = \frac{I_2}{3} + \frac{2I_3}{3} \qquad (14)$$

$$b_7 = I_3 \qquad (15)$$

Now using the linearly interpolated pixels $b_i$ (i=1 ... 7) the 7 by 1 convolution filter is applied to obtain the output pixels of the first pass of the algorithm in the x direction.

Output pixel $O_1$ are determined as follows:

$$O_1 = \sum_{i=1}^{7} a_i b_i \qquad (16)$$

where $a_i$ (i=1, ..., 7) are the coefficients of the convolution filter. If the expressions for $b_i$ (i=1, ... 7) are substituted from equations (9)–(15), the following expression is obtained:

$$O_1 = a_1 I_1 + a_2 + \left(\frac{2I_1}{3} + \frac{I_2}{3}\right) + a_3\left(\frac{I_1}{3} + \frac{2I_2}{3}\right) + \qquad (17)$$
$$a_4 I_2 + a_5\left(\frac{2I_2}{3} + \frac{I_3}{3}\right) + a_5\left(\frac{2I_2}{3} + \frac{I_3}{3}\right) +$$
$$a_6\left(\frac{I_2}{3} + \frac{2I_3}{3}\right) + a_7 I$$

Using known expressions for bicubic interpolation, an alternate expression for pixel value for $O_1$ follows:

$$O_1 = I_2 \qquad (18)$$

Comparing equations (17) and (18), and equating coefficients with corresponding input pixels values $I_i$, the following set of three linear equations for the filter coefficients $a_i$ is obtained:

$$a_1 + \frac{2}{3}a_2 + \frac{1}{3}a_3 = 0 \qquad (19)$$

$$\frac{1}{3}a_2 + \frac{2}{3}a_3 + a_4 + \frac{2}{3}a_5 + \frac{1}{3}a_6 = 1 \qquad (20)$$

$$\frac{1}{3}a_2 + \frac{2}{3}a_6 + a_7 = 0 \qquad (21)$$

By repeating the analog procedure for points $O_2$ and $O_3$, four additional equations for each point are obtained. This presents an overdetermined system of eleven linear equations with seven unknowns:

$$a_1 + \frac{2}{3}a_2 + \frac{1}{3}a_3 = 0 \qquad (22)$$

$$\frac{1}{3}a_2 + \frac{2}{3}a_3 + a_4 + \frac{2}{3}a_5 + \frac{1}{3}a_6 = 1 \qquad (23)$$

$$\frac{1}{3}a_2 + \frac{2}{3}a_6 + a_7 = 0 \qquad (24)$$

$$\frac{2}{3}a_1 + \frac{1}{3}a_2 = -\frac{10}{162} \qquad (25)$$

-continued $$\frac{1}{3}a_1 + \frac{2}{3}a_2 + a_3 + \frac{2}{3}a_4 + \frac{1}{3}a_5 = \frac{40}{54} \quad (26)$$

$$\frac{1}{3}a_4 + \frac{2}{3}a_5 + a_6\frac{2}{3}a_7 = \frac{20}{54} \quad (27)$$

$$\frac{1}{3}a_7 = \frac{8}{162} \quad (28)$$

$$\frac{1}{3}a_1 = \frac{8}{162} \quad (29)$$

$$\frac{2}{3}a_1 + a_2 + \frac{2}{3}a_3 + \frac{1}{3}a_4 = \frac{20}{54} \quad (30)$$

$$\frac{1}{3}a_3 + \frac{2}{3}a_4 + a_5 + \frac{2}{3}a_6 + \frac{1}{3}a_7 = \frac{40}{54} \quad (31)$$

$$\frac{1}{3}a_6 + \frac{2}{3}a_7 = \frac{10}{162} \quad (32)$$

The system of equations (22)–(32) can be expressed in matrix form as:

$$C=KA \quad (33)$$

where C is the vector of the corresponding coefficients $c_{ij}$ from right sides of 11 equations, K is the matrix of coefficients of linear equations, and A is the of 7 filter coefficients $a_i$, (i=1,7). The least squares solution of the system is:

$$A=(K^T K)^{-1} K^T C \quad (34)$$

Using this procedure the optimal 7 by 1 filter with the following coefficients is obtained:

| −1.4815e−01 | 1.1111e−01 | −2.2222e−01 | 6.2963e−01 | −2.2222e−01 | 1.111e−01 | −1.4815e−01 |
| --- | --- | --- | --- | --- | --- | --- |

The second algorithm utilizes a two step procedure including bilinear interpolation followed by the application of a 2D convolution filter. The second algorithm can be applied for any integer magnification factor m, and for any 2D convolution filter size n.

As described above, the first step is bilinear interpolation. In the case of magnification by a factor n, there are $n^2$ pixels in the new, zoomed, image that have fundamentally different positions with respect to the pixels of the source image. The values of new pixels, $B_{ij}$, with respect to the pixel values of the source image, $I_{ij}$, are given by the following equations:

$$B_{i,j} = \frac{(n-i+1)(n-j+1)}{n^2}I_{11} + \frac{(n-i+1)(j-1)}{n^2}I_{12} + \frac{(i-1)(n-j+1)}{n^2}I_{21} + \frac{(i-1)(j-1)}{n^2}I_{22} \quad (35)$$

for i,j=1, . . . , n where n is an odd number, and $$B_{i,j} = \frac{(n-i+0.5)(n-j+0.5)}{n^2}I_{11} + \frac{(n-i+0.5)(j-0.5)}{n^2}I_{12} + \frac{(i-0.5)(n-j+0.5)}{n^2}I_{21} + \frac{(i-.05)(j-0.5)}{n^2}I_{22} \quad (36)$$

for i, j=1, . . . , n where n is an even number. Values for $b_{ij}$ (instances of $B_{ij}$) can be calculated by using the expressions in equations (35) or (36) and substituting appropriate values for $I_{ij}$, i, and j depending on the position of $b_{ij}$ in the input image.

Using the bilinear interpolated pixels $b_{ij}$ (i,j=1, 2, . . . , m) the m by m convolution filters applied to obtain the output pixels. The following expression for the output pixel $O_{kl}$ is obtained:

$$O_{kl} = \sum_{i=1}^{m}\sum_{j=1}^{m} a_{ij} b_{ij} \quad (37)$$

where $a_{ij}$ (i,j=1, . . . , m) are the coefficients of the convolution filter. If the expressions for $b_{ij}$, (i,j=1, . . . , m), or the values of the corresponding $B_{op}$ from equations (35) or (36), are substituted in equation (37), the following expressions are obtained:

$$O_{kl} = \sum_{i_1=1}^{j}\sum_{i_2=1}^{j}\sum_{i_3=1}^{m}\sum_{i_4=1}^{m} k_{i_1 i_2 i_3 i_4} a_{i_3 i_4} I_{i_1 i_2} \quad (38)$$

where a $k_{ijkl}$ are the constant coefficients obtained by applying equations (35) or (36).

Using known expressions for bicubic interpolation, the alternate expression for the pixel value $O_{kl}$ can be obtained:

$$O_{kl} = \sum_{i=1}^{4}\sum_{i=j}^{4} c_{ij} I_{ij} \quad (39)$$

where $c_{ij}$ are the coefficients derived from the expressions for bicubic interpolation in the case of magnification by n. Comparing equations (38) and (39), and equating coefficients with corresponding input pixel values $I_{ij}$, a set of up to sixteen linear equations for the filter coefficients $a_{mn}$, is obtained:

$$\sum_{i_3=1}^{m}\sum_{i_4=1}^{m} k_{iji_3 i_4} a_{i_3 i_4} = c_{ij} \quad (40)$$

There can be less then sixteen equations if the pixels obtained by bilinear interpolation used by the convolution filter do not have any contribution from some input pixels $I_{ij}$. In that case, the number of equations is reduced by the number of such pixels. Repeating this procedure for all of the output pixels $O_{ij}$ (i,j=1, . . . , n) a system of linear equations for the convolution filter coefficients is obtained. This system can be expressed in matrix form as:

$$C=KA \quad (41)$$

where C is the vector of the corresponding coefficients $C_{ij}$ from right sides of equations (40), K is the matrix of coefficients $k_{ijkl}$ of those linear equations, and A is the vector of filter coefficients $a_{ij}$, (i,j=1, ..., m). For practical values of zoom factors n and filter sizes m this represents an overdetermined system of linear equations. In this case, the solution is obtained using the linear least squares method and it has the form:

$$A=(K^T K)^{-1} K^T C \tag{42}$$

Upon determining the coefficients A of the convolution filter that is to be applied, the whole procedure for altering the spatial characteristics of a digital image is defined.

For example, in one embodiment, the second algorithm has a magnification of three and a two dimensional convolution 7 by 7 filter. FIG. 4 illustrates the pixel scheme for this example, where $I_{ij}$ denote input pixels. Bilinear interpolation is applied to the input pixels, $I_{ij}$, first and $b_{ij}$ denote the results of bilinear interpolation. In the case of magnification of three, as shown in FIG. 4, there are nine fundamentally different positions of interpolated pixels with respect to input pixels throughout the image, and they are obtained using following equations:

$$b_{11} = \frac{I_{12}}{3} + \frac{2I_{22}}{3} \tag{43}$$

$$b_{12} = \frac{I_{12}}{3} + \frac{2I_{22}}{3} \tag{44}$$

$$b_{13} = \frac{2I_{12}}{9} + \frac{I_{13}}{9} + \frac{4I_{22}}{9} + \frac{2I_{23}}{9} \tag{45}$$

$$b_{21} = \frac{I_{21}}{3} + \frac{2I_{22}}{3} \tag{46}$$

$$b_{22} = I_{22} \tag{47}$$

$$b_{23} = \frac{2I_{22}}{3} + \frac{I_{23}}{3} \tag{48}$$

$$b_{31} = \frac{2I_{22}}{9} + \frac{4I_{22}}{9} + \frac{I_{31}}{9} + \frac{2I_{32}}{9} \tag{49}$$

$$b_{32} = \frac{2I_{22}}{3} + \frac{I_{32}}{3} \tag{50}$$

$$b_{33} = \frac{4I_{22}}{9} + \frac{2I_{23}}{9} + \frac{2I_{32}}{9} + \frac{I_{33}}{9} \tag{51}$$

Equations of the similar form hold for all other bilinear interpolated pixels $b_{ij}$. Now using the bilinear interpolated pixels $b_{ij}$ (i,j=1 ... 7) the 7 by 7 convolution filter is applied to obtain the output pixels, $O_{ij}$ so that the expression for output pixel $O_{11}$, are obtained:

$$O_{11} = \sum_{i=1}^{7} \sum_{j=1}^{7} a_{ij} b_{ij} \tag{52}$$

where $a_{ij}$ (i,j=1, ..., 7) are the coefficients of the convolution filter.

Substituting here the expressions for $b_{ij}$ (i,j=1, ... 7), from equations (43)–(51) and analog for other $b_{ij}$, the following expression results:

$$O_{11} = a_{11}\left(\frac{I_{11}}{9} + \frac{2I_{12}}{9} + \frac{2I_{21}}{9} + \frac{4I_{22}}{9} + a_{12}\left(\frac{I_{12}}{3} + \frac{2I_{22}}{3}\right) + \tag{53}$$

$$a_{13}\left(\frac{2I_{12}}{9} + \frac{I_{13}}{9} + \frac{4I_{22}}{9} + \frac{2I_{23}}{9}\right) - \ldots +$$

$$a_{76}\left(\frac{2I_{33}}{9} + \frac{I_{34}}{9} + \frac{4I_{43}}{9} + \frac{4I_{43}}{9} + \frac{2I_{44}}{9}\right) +$$

$$a_{77}\left(\frac{I_{33}}{9} + \frac{2I_{34}}{9} + \frac{2I_{43}}{9} + \frac{4I_{44}}{9}\right)$$

or $$O_{11} = a_{11}\left(\frac{I_{11}}{9} + \frac{2I_{12}}{9} + \frac{2I_{21}}{9} + \frac{4I_{22}}{9} + a_{12}\left(\frac{I_{12}}{3} + \frac{2I_{22}}{3}\right) + \tag{54}$$

$$a_{13}\left(\frac{2I_{12}}{9} + \frac{I_{13}}{9} + \frac{4I_{22}}{9} + \frac{2I_{23}}{9}\right) + \ldots +$$

$$I_{43}\left(\frac{a_{63}}{9} + \frac{2a_{64}}{9} + \frac{a_{65}}{3} + \frac{2a_{66}}{9} + \frac{a_{67}}{9} + \right.$$

$$\left.\frac{2a_{73}}{9} + \frac{4a_{74}}{9} + \frac{2a_{75}}{3} + \frac{4a_{76}}{9} + \frac{2a_{77}}{9}\right) +$$

$$I_{44}\left(\frac{a_{66}}{9} + \frac{2a_{67}}{9} + \frac{2a_{76}}{9} + \frac{4a_{77}}{9}\right)$$

Using known expressions for bicubic interpolation, an alternate expression for pixel value for $O_{11}$, can be obtained:

$$O_{11} = \sum_{i=1}^{4} \sum_{j=1}^{4} c_{ij} I_{ij} \tag{55}$$

where $C_{ij}$ are the coefficients derived from the expressions for bicubic interpolation for the case of magnification of three. Comparing equations (54) and (55), and equating coefficients with the corresponding input pixels values $I_{ij}$, the following set of sixteen linear equations for filter coefficients $a_{ij}$ is obtained:

$$\frac{a_{11}}{9} = \frac{16}{6561} \tag{56}$$

$$\frac{2a_{11}}{9} + \frac{a_{12}}{3} + \frac{2a_{13}}{9} + \frac{a_{14}}{9} = \frac{40}{2187} \tag{57}$$

$$\frac{a_{13}}{9} + \frac{2a_{14}}{9} + \frac{a_{15}}{3} + \frac{2a_{16}}{9} + \frac{a_{17}}{9} = \frac{80}{2187} \tag{58}$$

...

$$\frac{a_{63}}{9} + \frac{2a_{64}}{9} + \frac{a_{65}}{3} + \frac{2a_{66}}{9} + \frac{a_{67}}{9} + \tag{59}$$

$$\frac{2a_{73}}{9} + \frac{4a_{74}}{9} + \frac{2a_{75}}{3} + \frac{4a_{76}}{9} + \frac{2a_{77}}{9} = \frac{100}{218}$$

$$\frac{a_{66}}{9} + \frac{2a_{67}}{9} + \frac{2a_{76}}{9} + \frac{4a_{77}}{9} = \frac{25}{6581} \tag{60}$$

By repeating the procedure for point $O_{12}$, a set of 12 equations was derived, set of 16 equations for point $O_{13}$, 12 for point $O_{21}$, 9 for point $O_{22}$, 12 for point $O_{23}$, 16 for point $O_{31}$, 12 for point $O_{32}$, and 16 for point $O_{33}$. This presents an overdetermined system of 121 linear equations with 49 unknowns. The system expressed in matrix form as:

$$C=KA \tag{61}$$

where C is the vector of corresponding coefficients $c_{ij}$ from right sides of 121 equations, K is the matrix of coefficients of linear equations, and A is the vector of 49 filter coefficients $a_{ij}$, (i,j 1, ... 7). The least squares solution of the system has the form:

$$A=(K^T K)^{-1} K^T C \tag{62}$$

Using this procedure, the optimal 7 by 7 filter is:

| 2.1947e-02 | −1.64640e-02 | −3.2921e-02 | −9.3278e-01 | −3.2921e-02 | −1.6460e-02 | 2.1947e-021 |
|---|---|---|---|---|---|---|
| −1.6460e-02 | 1.2345e-02 | 2.4691e-02 | 6.9958e-02 | 2.4691e-02 | 1.2345e-02 | −1.6460e-02 |
| −3.2921e-02 | 2.4691e-02 | 4.9382e-02 | 1.3991e-01 | 4.9382e-02 | 2.4691e-02 | −3.2921e-02 |
| −9.3278e-02 | 6.9958e-02 | 1.3991e-01 | 3.9643e-01 | 1.3991e-01 | 6.9958e-02 | −9.3278e-02 |
| −3.2921e-02 | 2.4691e-02 | 4.9382e-02 | 1.3991e-01 | 4.9382e-02 | 2.4691e-02 | −3.2921e-02 |
| −1.6460e-02 | 1.2345e-02 | 2.4691e-02 | 6.9958e-02 | 2.4691e-02 | 1.2345e-02 | −1.6460e-02 |
| 2.1947e-02 | −1.6460e-02 | −3.2921e-02 | −9.3278e-02 | −3.2921e-02 | −1.6460e-02 | 2.1947e-02 |

The above described algorithms provide the advantages of generating real-time high quality magnified images. In addition, the algorithms are executed utilizing available graphical packages.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A computed tomography system comprising an x-ray source, an x-ray detector aligned with said x-ray source, and a processor coupled to said x-ray detector, said processor programmed to:

generate a digital image from the output of the x-ray detector; and dynamically magnify the digital image to provide a magnified image, wherein to dynamically magnify the digital image, the processor is configured to execute at least one of (a) a two pass algorithm in which each of the passes represents interpolation in the x and y directions respectively, and (b) a bilinear interpolation algorithm including a two dimensional convolution filter.

2. A system in accordance with claim 1 wherein to execute said two pass algorithm, said processor is configured to:

generate interpolated data using linear interpolation; and apply a one dimensional convolution filter to said interpolated data.

3. A system in accordance with claim 2 wherein said system is configured to magnify the digital image by any integer zoom factor, n, and said filter is a m by one convolution filter.

4. A system in accordance with claim 3 wherein to apply said one dimensional convolution filter to the interpolated data, said processor is configured to determine coefficients of said one dimensional convolution filter.

5. A system in accordance with claim 4 wherein the digital image comprises any number, i, of input pixels, $I_i$, and wherein to determine said convolution filter coefficients, said processor is further configured to generate new pixel values, $B_i$.

6. A system in accordance with claim 5 wherein the digital image comprises at least two input pixels, $I_1$ and $I_2$, and wherein said new pixel values are determined in accordance with:

$$B_i = \frac{(n-i+1)}{n}I_1 + \frac{(i-1)}{n}I_2$$

for i=1, . . . , n, where n is an odd number; and $$B_i = \frac{(n-i+0.5)}{n}I_1 + \frac{(i-0.5)}{n}I_2$$

for i=1, . . . , n, where n is an even number.

7. A system in accordance with claim 6 wherein said one dimensional convolution filter is a m by one convolution filter and wherein said output pixels are determined in accordance with:

$$O_k = \sum_{i=1}^{m} a_i b_i$$

where $a_i$ (i=1, . . . , m) are coefficients of said convolution filter.

8. A system in accordance with claim 6 wherein to apply said one dimensional convolution filter, said processor is configured to generate output pixels $O_k$.

9. A system in accordance with claim 1 wherein to execute said bilinear interpolation algorithm, said processor is configured to:

generate interpolated data using bilinear interpolation; and apply a two dimensional convolution filter to said interpolated data.

10. A system in accordance with claim 9 wherein said system is configured to magnify the digital image by an integer zone factor n and said convolution filter is a m by m convolution filter.

11. A system in accordance with claim 10 wherein to apply said two dimensional convolution filter, said processor is configured to determine coefficients of said two dimensional convolution filter.

12. A system in accordance with claim 11 wherein the digital image comprises any number, i, of input pixels, $I_j$, and wherein to determine said convolution filter coefficients, said processor is configured to generate new pixel values, $B_{ij}$, where i,j=1, . . . n.

13. A system in accordance with claim 12 wherein said one dimensional convolution filter is a m by m convolution filter and wherein the digital image comprises at least two input pixels, $I_1$ and $I_2$, and wherein said new pixel values are determined in accordance with:

$$B_{ij} = \frac{(n-i+1)(n-j+1)}{n^2}I_{11} + \frac{(n-i+1)(j-1)}{n^2}I_{12} +$$
$$\frac{(i-1)(n-j+1)}{n^2}I_{21} + \frac{(i-1)(j-1)}{n^2}I_{22}$$

for i,j=1, . . . , n, where n is an odd number; and $$B_{ij} = \frac{(n-i+0.5)(n-j+0.5)}{n^2}I_{11} + \frac{(n-i+0.5)(j-0.5)}{n^2}I_{12} + \frac{(i-0.5)(n-j+0.5)}{n^2}I_{21} + \frac{(i-0.5)(j-1)}{n^2}I_{22}$$

for i,j=1, . . . , n, where n is an even number.

14. A system in accordance with claim 13 wherein to apply said two dimensional convolution filter, said processor is configured to generate output pixels $O_{kl}$.

15. A system in accordance with claim 14 wherein said output pixels are determined in accordance with:

$$O_{kl} = \sum_{i=1}^{m}\sum_{j=1}^{m} a_{ij}b_{ij}$$

where $a_{ij}$ (i,j=1, . . . , m) are coefficients of said convolution filter.

16. A method for altering spatial characteristics of a digital image comprising the steps of:
collecting the digital image; and
dynamically magnifying the digital image to provide a magnified image by executing at least one of (a) a two pass algorithm in which each of the passes represents interpolation in the x and y directions respectively, and (b) a bilinear interpolation algorithm including a two dimensional convolution filter.

17. A method in accordance with claim 16 wherein executing the two pass algorithm comprises the steps of:
generating interpolated data using linear interpolation; and
applying a one dimensional convolution filter to the interpolated data.

18. A method in accordance with claim 17 wherein dynamically magnifying the digital image comprises the step of magnifying the digital image by any integer zoom factor, n, and applying the one dimensional filter to the interpolated data comprises applying a m by one convolution filter.

19. A method in accordance with claim 17 wherein applying the one dimensional convolution filter to the interpolated data comprises the step of determining coefficients of the one dimensional convolution filter.

20. A method in accordance with claim 19 wherein the digital image comprises any number, i, of input pixels, $I_i$, and wherein determining the convolution filter coefficients, said method further comprises the step of generating new pixel values, $B_i$.

21. A method in accordance with claim 20 wherein the digital image comprises at least two input pixels, $I_1$ and $I_2$, and wherein generating new pixel values are determined in accordance with:

$$B_i = \frac{(n-i+1)}{n}I_1 + \frac{(i-1)}{n}I_2$$

for i=1, . . . , n, where n is an odd number; and $$B_i = \frac{(n-i+0.5)}{n}I_1 + \frac{(i-0.5)}{n}I_2$$

for i=1, . . . , n, where n is an even number.

22. A method in accordance with claim 21 wherein applying the one dimensional convolution filter comprises the step of generating output pixels $O_k$.

23. A method in accordance with claim 22 wherein the one dimensional convolution filter is a m by one convolution filter and wherein output pixels are determined in accordance with:

$$O_k = \sum_{i=1}^{m} a_i b_i$$

where $a_i$ (i=1, . . . , m) are the coefficients of the convolution filter.

24. A method in accordance with claim 16 wherein executing the bilinear interpolation comprises the steps of:
generating interpolated data using bilinear interpolation; and
applying a two dimensional convolution filter to the interpolated data.

25. A method in accordance with claim 24 wherein magnifying the digital image comprises the step of magnifying the digital image by an integer zoom factor n and wherein applying the two dimensional convolution filter comprises the step of applying a m by m convolution filter.

26. A method in accordance with claim 25 wherein applying the two dimensional convolution filter comprises the step of, determining coefficients of the two dimensional convolution filter.

27. A method in accordance with claim 26 wherein the digital image comprises any number, i, of input pixels, $I_i$, and wherein determining the convolution filter coefficients comprises the step of generating new pixel values, $B_{ij}$, where i,j=1, . . . n.

28. A method in accordance with claim 27 wherein the digital image comprises at least two input pixels, $I_1$ and $I_2$, and wherein the new pixel values are determined in accordance with:

$$B_{ij} = \frac{(n-i+1)(n-j+1)}{n^2}I_{11} + \frac{(n-i+1)(j-1)}{n^2}I_{12} + \frac{(i-1)(n-j+1)}{n^2}I_{21} + \frac{(i-1)(j-1)}{n^2}I_{22}$$

for i,j=1, . . . , n, where n is an odd number; and $$B_{ij} = \frac{(n-i+0.5)(n-j+0.5)}{n^2}I_{11} + \frac{(n-i+0.5)(j-0.5)}{n^2}I_{12} + \frac{(i-0.5)(n-j+0.5)}{n^2}I_{21} + \frac{(i-0.5)(j-1)}{n^2}I_{22}$$

for i,j=1, . . . , n, where n is an even number.

29. A method in accordance with claim 28 wherein applying the two dimensional convolution filter comprises the step of generating output pixels $O_{kl}$.

30. A method in accordance with claim 29 wherein the output pixels are determined in accordance with:

$$O_{kl} = \sum_{i=1}^{m}\sum_{j=1}^{m} a_{ij}b_{ij}$$

where $a_{ij}$ (i,j=1, . . . , m) are coefficients of the convolution filter.

31. A system for altering spatial characteristics of a digital image configured to:
collect the digital image; and
dynamically magnify the digital image to provide a magnified image, wherein to dynamically magnify the digital image, said system is configured to execute at least one of (a) a two pass algorithm in which each of the passes represents interpolation in the x and y directions respectively, and (b) a bilinear interpolation algorithm including a two dimensional convolution filter.

32. A system in accordance with claim 31 wherein to execute said two pass algorithm, said system is configured to:

generate interpolated data using linear interpolation; and apply a one dimensional convolution filter to said interpolated data.

33. A system in accordance with claim 32 wherein said system is configured to magnify the digital image by any integer zoom factor, n, and said filter is a m by one convolution filter.

34. A system in accordance with claim 33 wherein to apply said one dimensional convolution filter to the interpolated data, said system is configured to determine coefficients of said one dimensional convolution filter.

35. A system in accordance with claim 34 wherein the digital image comprises any number, i, of input pixels, $I_i$, and wherein to determine said convolution filter coefficients, said system is further configured to generate new pixel values, $B_i$.

36. A system in accordance with claim 35 wherein the digital image comprises at least two input pixels, $I_1$ and $I_2$, and wherein said new pixel values are determined in accordance with:

$$B_i = \frac{(n-i+1)}{n}I_1 + \frac{(i-1)}{n}I_2$$

for i=1, ... , n, where n is an odd number; and $$B_i = \frac{(n-i+0.5)}{n}I_1 + \frac{(i-0.5)}{n}I_2$$

for i=1, ... , n, where n is an even number.

37. A system in accordance with claim 36 wherein to apply said one dimensional convolution filter, said system is configured to generate output pixels $O_k$.

38. A system in accordance with claim 36 wherein said one dimensional convolution filter is a m by one convolution filter and wherein said output pixels are determined in accordance with:

$$O_k = \sum_{i=1}^{m} a_i b_i$$

where $a_i$ (i=1, ... , m) are coefficients of said convolution filter.

39. A system in accordance with claim 31 wherein to execute said bilinear interpolation algorithm, said system is configured to:

generate interpolated data using bilinear interpolation; and apply a two dimensional convolution filter to said interpolated data.

40. A system in accordance with claim 39 wherein said system is configured to magnify the digital image by an integer zone factor n and said convolution filter is a m by m convolution filter.

41. A system in accordance with claim 40 wherein to apply said two dimensional convolution filter, said system is configured to determine coefficients of said two dimensional convolution filter.

42. A system in accordance with claim 41 wherein the digital image comprises any number, i, of input pixels, $I_i$, and wherein to determine said convolution filter coefficients, said system is configured to generate new pixel values, $B_{ij}$, where i,j=1, ... n.

43. A system in accordance with claim 42 wherein said two dimensional convolution filter is a m by m convolution filter and wherein the digital image comprises at least two input pixels, $I_1$ and $I_2$, and wherein said new pixel values are determined in accordance with:

$$B_{ij} = \frac{(n-i+1)(n-j+1)}{n^2}I_{11} + \frac{(n-i+1)(j-1)}{n^2}I_{12} + \frac{(i-1)(n-j+1)}{n^2}I_{21} + \frac{(i-1)(j-1)}{n^2}I_{22}$$

for i,j=1, ... , n, where n is an odd number; and $$B_{ij} = \frac{(n-i+0.5)(n-j+0.5)}{n^2}I_{11} + \frac{(n-i+0.5)(j-0.5)}{n^2}I_{12} + \frac{(i-0.5)(n-j+0.5)}{n^2}I_{21} + \frac{(i-0.5)(j-1)}{n^2}I_{22}$$

for i,j=1, ... , n, where n is an even number.

44. A system in accordance with claim 43 wherein to apply said two dimensional convolution filter, said system is configured to generate output pixels $O_{kl}$.

45. A system in accordance with claim 44 wherein said output pixels are determined in accordance with:

$$O_{kl} = \sum_{i=1}^{m}\sum_{j=1}^{m} a_{ij} b_{ij}$$

where $a_{ij}$ (i,j=1, ... , m) are coefficients of said convolution filter.

* * * * *